(12) United States Patent
Wu

(10) Patent No.: US 9,167,626 B1
(45) Date of Patent: Oct. 20, 2015

(54) FIBER STRIPPING METHODS AND APPARATUS

(71) Applicant: CORNING OPTICAL COMMUNICATIONS LLC, Hickory, NC (US)

(72) Inventor: Qi Wu, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/609,855

(22) Filed: Jan. 30, 2015

(51) Int. Cl.
*H05B 3/06* (2006.01)

(52) U.S. Cl.
CPC ........................................ *H05B 3/06* (2013.01)

(58) Field of Classification Search
CPC ............ B08B 7/00; B08B 5/02; Y10S 65/09; Y10T 156/1153; Y10T 156/1939; Y10T 156/1137; Y10T 156/1972; Y10T 156/1168; G02B 6/245; G02B 6/4497; G02B 6/125; G02B 6/44; G02B 6/05; G09K 5/00; G02F 1/3132; B32B 38/10; B32B 43/00; F24J 3/04; F26B 17/00
See application file for complete search history.

(56) References Cited

U.S. PATENT DOCUMENTS

| | | | | |
|---|---|---|---|---|
| 5,378,300 A * | 1/1995 | Huvard et al. | ................. | 156/706 |
| 5,968,283 A | 10/1999 | Walraven et al. | ................ | 134/19 |
| 6,244,323 B1 | 6/2001 | Miller | ............................ | 156/584 |
| 6,402,856 B1 | 6/2002 | Vetrano | ........................... | 134/19 |
| 7,003,985 B2 | 2/2006 | Swain et al. | ..................... | 65/473 |
| 8,330,081 B2 * | 12/2012 | Dimmick et al. | ............. | 219/424 |
| 2008/0128084 A1 | 6/2008 | Dunwoody et al. | .......... | 156/344 |

OTHER PUBLICATIONS

Noncontact Optical Fiber Coating Removal Technique With Hot Air Stream, Park et al., Journal of Lightwave Technology, vol. 23, No. 2, Feb. 2005, 7 pages.

* cited by examiner

*Primary Examiner* — Shawntina Fuqua

(57) ABSTRACT

An apparatus for removing at least one coating from a lengthwise section of an optical fiber includes a heater configured for heating a heating region to a temperature above a thermal decomposition temperature of the at least one coating; a securing mechanism configured for securing the optical fiber so that the lengthwise section of the optical fiber is positioned in the heating region; and a controller operatively associated with the heater, wherein the controller is configured for deactivating the heater not later than immediately after removal of the at least one coating from the lengthwise section of the optical fiber in the heating region, and the heater may be deactivated before the removal of the at least one coating from the lengthwise section of the optical fiber.

18 Claims, 5 Drawing Sheets

FIBER STRIPPING METHODS AND APPARATUS

BACKGROUND

This disclosure generally relates to stripping optical fiber coatings and, more particularly, to methods and apparatus for non-contact stripping of optical fiber coatings.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or in the field (e.g., using a "field-installable" fiber optic connector).

Regardless of where installation occurs and the type of connector used, stripping of optical fiber coatings is typically an important step in terminating optical fibers in preparation for installing connectors. For field installations, an inherently accurate and robust coating stripping tool can be of particular importance because the technicians or operators making the installations may have varying amounts of relevant training or experience.

A bare glass fiber and a 250 um coated optical fiber may appear indistinguishable to untrained eyes. Therefore, mechanical stripping can be challenging due to visibility issues. In addition, mechanical stripping may cause direct contact between tool blades and bare glass, which can cause flaws in the optical fibers and reduce their tensile strengths. Such flaws and reductions in tensile strength may be restricted through the use of non-contact stripping methods and apparatus. However, at least some of the non-contact stripping methods and apparatus are better suited for manufacturing settings rather than field settings.

There is a desire for fiber stripping methods and apparatus that provide a new balance of properties.

SUMMARY

An aspect of this disclosure is the provision of methods and apparatus for use in non-contact stripping of optical fibers.

In accordance with an embodiment of this disclosure, an apparatus for removing at least one coating from a lengthwise section of an optical fiber comprises a heater configured for heating a heating region to a temperature above a thermal decomposition temperature of the at least one coating; a securing mechanism configured for securing the optical fiber so that the lengthwise section of the optical fiber is positioned in the heating region; and a controller operatively associated with the heater, wherein the controller is configured for deactivating the heater not later than immediately after removal of the at least one coating from the lengthwise section of the optical fiber in the heating region. The heater may be an electrical resistance heater.

In one example, the controller may be configured for both causing the heater to heat the heating region to the temperature above the thermal decomposition temperature of the at least one coating, and deactivating the heater before removal of the at least one coating from the lengthwise section of the optical fiber in the heating region. For example, the controller may be configured for deactivating the heater at a predetermined time after the controller activates the heater, wherein the predetermined time may be within a range of from about 200 milliseconds to about 2 seconds. Deactivating the heater at the predetermined time may result in the heater being deactivated before removal of the at least one coating from the lengthwise section of the optical fiber. For example, the heater may be deactivated at a time that is within a range of from about 1 millisecond to about 500 milliseconds before removal of the at least one coating from the lengthwise section of the optical fiber.

In accordance with another embodiment, a method for removing at least one coating from a lengthwise section of an optical fiber comprises securing the optical fiber so that the lengthwise section of the optical fiber in positioned in a heating region; heating the at least one coating of the lengthwise section of the optical fiber to a temperature above a thermal decomposition temperature of the at least one coating while the lengthwise section of the optical fiber is in the heating region, wherein the heating is comprised of operating a heater; and deactivating the heater not later than immediately after removal of the at least one coating from the lengthwise section of the optical fiber in the heating region.

In one example, the deactivating of the heater can be comprised of deactivating the heater at a predetermined time before removal of the at least one coating from the lengthwise section of the optical fiber in the heating region, wherein this predetermined time may be within a range of from about 1 millisecond to about 500 milliseconds before removal of the at least one coating from the lengthwise section of the optical fiber. In another example, the deactivating of the heater can be comprised of deactivating the heater at a predetermined time after the activating of the heater, wherein this predetermined time may be within a range of from about 200 milliseconds to about 2 seconds. Deactivating the heater at a time within the range of from about 200 milliseconds to about 2 seconds after activating the heater may result in the heater being deactivated at a time that is within the range of from about 1 millisecond to about 500 milliseconds before removal of the at least one coating from the lengthwise section.

The at least one coating may comprise an inner coating and an outer coating having a thermal decomposition temperature above the thermal decomposition temperature of the inner coating. The heating may comprise heating the inner coating to a temperature that is above the thermal decomposition temperature of the inner coating and below the thermal decomposition temperature of the outer coating, so that the removing of the at least one coating from the lengthwise section of the optical fiber is comprised of exploding the at least one coating away from the lengthwise section of the optical fiber. The lengthwise section of the optical fiber may be positioned in an ambient atmosphere during the exploding.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments.

Features and attributes associated with any of the embodiments shown or described may be applied to other embodiments shown, described, or appreciated based on this disclosure.

DETAILED DESCRIPTION

Various embodiments will be further clarified by examples in the description below. In general, this description relates to an optical fiber stripping apparatus 10 and methods of stripping optical fibers, wherein the stripping may comprise a heat-induced burst or explosion.

Figure 1:
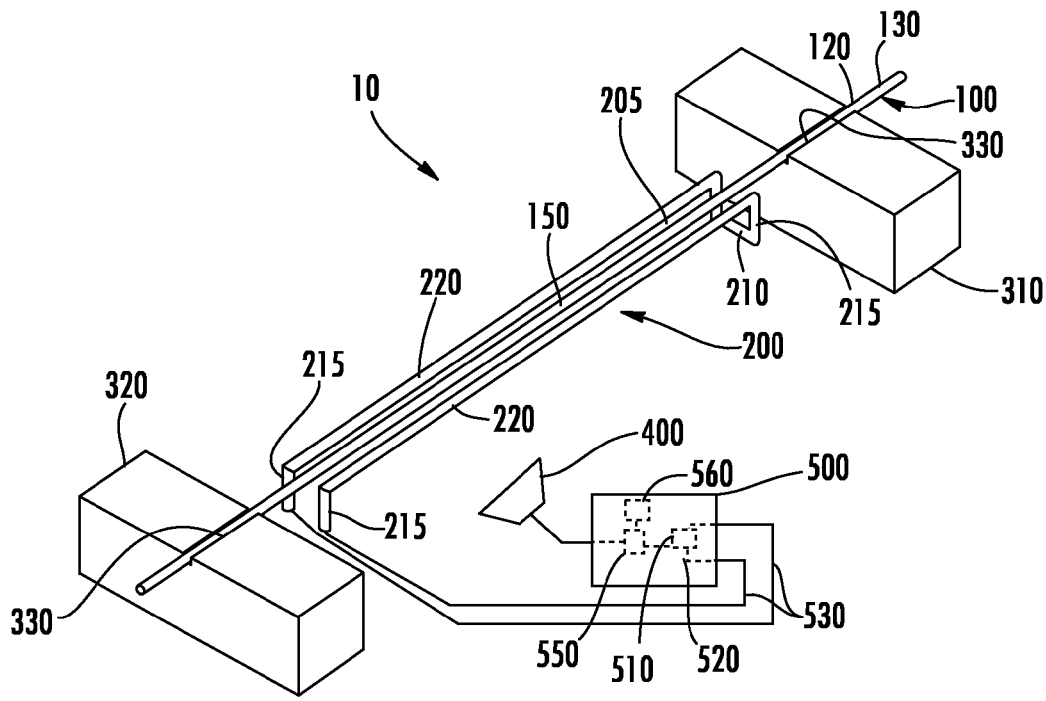
FIG. 1 is schematic perspective view of a length of unstripped optical fiber secured to an optical fiber stripping apparatus, in accordance with an embodiment of this disclosure.

FIG. 1 illustrates a stripping apparatus 10 configured so that it can be used for stripping away a length of at least one coating of an optical fiber 100, in accordance with an embodiment of this disclosure. In the example shown in FIG. 2, the optical fiber 100 includes a substantially cylindrical multi-layer coating 140 comprising substantially cylindrical polymer coatings 120, 130. As shown in FIG. 1, the stripping apparatus 10 comprises at least one heater 200, securing mechanisms 310, 320 for holding the optical fiber 100 in a reproducible position, and a controller 500 for controlling the heater 200. A sensor 400 may also be included in the stripping apparatus 10.

In one example, the heater 200 can consist of, or consist essentially of, a resistance heating metal alloy such as, but not limited to, Nichrome, so that the heater has a relatively low thermal mass as compared to ceramic materials. In addition, the heater 200 may be shaped and positioned so as to extend along and be substantially parallel to a heating region 205 through which the optical fiber 100 substantially coaxially extends. The heater 200, heating region 205, and optical fiber 100 may be cooperatively configured for facilitating substantially uniform heating over or along a lengthwise section ("fiber section") 150 of the optical fiber 100. The fiber section 150 may be positioned in close proximity to the heater 200, so that the heater 200 can be operated to rapidly heat the coatings 120, 130 of the fiber section 150 by way of natural convection rather than forced convention. The coatings 120, 130 of the fiber section 150 may also be heated by radiative heat transfer from the heater 200.

The heater 200 may comprise at least one resistive heating element that may be in the form of a high resistance electrical wire 210 that becomes very hot in response to the flow of electrical current therethrough. The metal wire 210 can be in a bent configuration so that it includes upright sections 215 supporting linear portions or elongate sections 220, wherein the sections 220 can function as electrical resistors and may be referred to as first and second electrical resistors, although different types of electrical resistors are within the scope of this disclosure.

A majority of the wire 210 can be in the form of the elongate sections ("resistive sections") 220 that function as electrical resistors that become hot when electrical current flows therethrough. The resistive sections 220 may be substantially parallel to one another, and they may also be arranged substantially radially symmetrically around substantially coaxial central axes of the heating region 205 and the fiber section 150. In the embodiment shown in the drawings, when the fiber 100 is secured by the securing mechanisms 310, 320, the fiber section 150 to be processed extends between, along, and is substantially parallel to the elongate resistive sections 220 of the wire 210. The above-discussed arrangements seek to ensure that the fiber section 150 to be processed is heated substantially uniformly both radially and axially. The heater 200 may be constructed and/or arranged in any other suitable configuration for causing the fiber section 150 to be heated substantially uniformly both radially and axially.

The securing mechanisms 310, 320 may comprise one or more supports that can be in the form of a first securing block 310 and a second securing block 320. The fiber 100 may be secured in V-grooves 330 or other shapes of fiber groves 330 on the blocks 310, 320. In addition or alternatively, clips and/or other suitable supporting and/or securing features may be included in the stripping apparatus 10 for securing the fiber 100 so that the heating region 205 and fiber section 150 are substantially coaxial. The blocks 310, 320 may further include protruding members or other mechanical structures extending into opposite ends of a hot zone, which may be adjacent to the heating region 205, to shield parts of the fiber 100 from heat so as to create well-defined edges of the unstripped coatings 120, 130 after stripping. The securing mechanisms 310, 320 and associated features can be configured for keeping the fiber section 150 straight and untensioned during the stripping, which seeks to maintain the tensile strength of the fiber 100.

Figure 2:
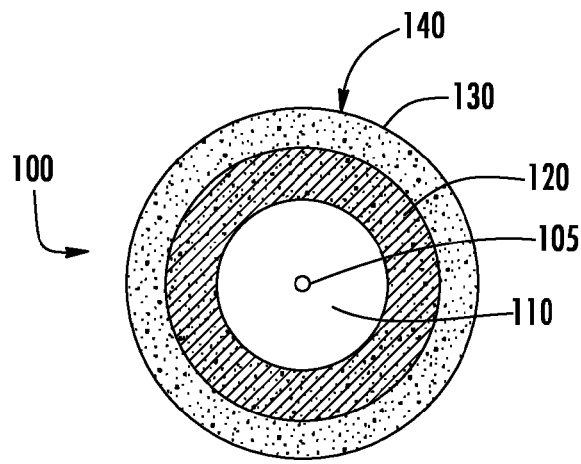
FIG. 2 is an isolated cross-sectional view of an example of the unstripped optical fiber of FIG. 1.

Referring to FIG. 2 in greater detail, the multi-layer coating 140 of the fiber 100 can comprise a dual-layer polymer coating 120, 130 that extends around a glass cladding 110 and glass core 105. The inner primary coating 120 may be configured to act as a shock absorber to minimize attenuation caused by any micro-bending of the fiber 100. The outer secondary coating 130 may be configured to protect the primary coating 120 against mechanical damage, and to act as a barrier to lateral forces. For example, the secondary coating 130 may have a diameter of about 200 um. The multi-layer coating 140 can further include a colored, thin ink layer for identification, and this additional layer may be coated onto the outer surface of the secondary coating 130. The outer diameter of the coated optical fiber 100 may be about 250 um.

In accordance with an embodiment of this disclosure, the cladding 110 and core 105 have a higher thermal decomposition temperature than the coatings 120, 130, and the primary coating 120 is softer than and has a lower thermal decomposition temperature than the secondary coating 130. A variety of polymeric materials are suitable for use as the primary and secondary coatings 120, 130. For example, the primary coating 120 may be soft UV-cured polymers, and the secondary coating 130 may be highly cross-linked UV-cured polymers.

In one example, the primary coating 120 can have a thermal decomposition temperature of about 279° C., and the secondary coating 130 can have a thermal decomposition temperature of about 284° C., so that the difference in their thermal decomposition temperatures is about 100° C.

With the coatings 120, 130 having different vaporization or thermal decomposition temperatures and the fiber section 150 positioned in the heating region 205 as discussed above, the heater 200 can be operated to rapidly heat the coatings 120, 130 of the fiber section 150 to a temperature that is above the thermal decomposition temperature of the primary coating 120 but below the thermal decomposition temperature of the secondary coating 130. As a result, the primary coating 120 of the fiber section 150 can decompose into gas and cause sufficient pressure to build up inside the secondary coating 130 of the fiber section 150 for causing an explosive rupture of the region encircled by the secondary coating 130 of the fiber section 150, without substantially damaging the cladding 110 or core 105 of the fiber 100.

In the embodiment illustrated in the drawings, the stripping apparatus 10 does not use forced convention to heat the coatings 120, 130 and the coatings are not heated in an inert gas environment. Rather, the stripping apparatus 10 may be configured so that the coatings 120, 130 are heated in the ambient atmosphere and the coatings are heated by natural convection and any associated conductive and radiant heat transfer.

As shown in FIG. 1, the fiber section 150 can be a mid span of the optical fiber 100. When the fiber section 150 is a mid span of the fiber 100, the lengthwise sections of the fiber 100 immediately adjacent to the mid span fiber section 150 can function as boundary structures that at least partially contain the pressure generated by the decomposing primary coating 120 of the fiber section 150, so that leakage of the pressure from the fiber section 150 is restricted from escaping out of ends of the fiber section 150, so that the pressure is contained in a restricted area (e.g., contained within the region encircled by the fiber section 150) in a manner that seeks to provide the desired, controlled exploding and stripping of the coatings 120, 130 of the fiber section 150. As a contrasting example, when the fiber section 150 is an end section of the fiber 100, it may be the case that the pressure generated by the vaporizing primary coating 120 of the fiber section 150 escapes out the end of the fiber section 150 such that the explosion may not occur. Instead, the coatings 120, 130 of the fiber section 150 may decompose or burn. Alternatively, when the fiber section 150 includes or is proximate an end of the fiber 100, the end of the fiber may be at least partially shielded, so that the end of the fiber remains cool enough to serve as a boundary for substantially containing the vapor pressure, and in response to the explosion the remaining coatings 120, 130 at the end of the fiber may also burst away. For example, one or more of the blocks 310, 320 may include protruding shielding members or other mechanical structures extending into opposite ends of the hot zone to shield an end of the fiber 100 from heat.

The stripping apparatus 10 can be operated, such as under the control of the controller 500, so that the coatings 120, 130 of the fiber section 150 are rapidly heated to the temperature at which the secondary coating 130 bursts (e.g., in response to the vaporization of the primary coating 120). This heating can comprise quickly heating the heater 200 while the heater is in close proximity to the lengthwise fiber section 150 to create a temperature field over the fiber section 150 that is substantially uniform. For example, the heater 200 can have a low thermal mass, such that after it is turned on it may be rapidly heated to above 800° C. in less than 1 second. The close proximity of the heater 200 to the lengthwise fiber section 150 can enable the heating of the coatings 120, 130 to a temperature beyond the burst temperature of about 400° C. in less than 1 second, causing the vaporization of the primary coating 120 and bursting away of the secondary coating 130 within about 1 second from the heater 200 being turned on.

The heater 200 can be configured and operated, such as under the control of the controller 500, so that the temperature field across the cross section of the lengthwise fiber section 150 can be substantially uniform, which can have the affect of maintaining the integrity of the secondary coating 130 until the burst temperature is reached. In contrast, an uniform temperature field can lead to decomposition of the secondary coating 130, rendering it unable to contain sufficient vapor pressure for the desired explosion or bursting. Without the explosion process, slow decomposition and oxidation of the coating 130 may generate harmful gas.

The heater 200, or more specifically each of the elongate resistive sections 220 of the wire 210, can have a length L (FIGS. 3A, 3C and 3D) of, for example, about 12 mm, so that the fiber section 150 that is substantially uniformly heated, and thus stripped by the stripping apparatus 10, can have a length L of about 12 mm, which length L can be sufficient for many connector applications. In addition, these lengths L of the heater 200 and the fiber section 150 that is substantially uniformly heated and stripped can be longer or shorter than about 12 mm, as discussed in greater detail below.

The stripping apparatus 10 can be operated so that the explosion (e.g., stripping) of the coatings 120, 130 occurs substantially simultaneously along the entire length L (FIGS. 3A, 3C and 3D) of the fiber section 150. As examples, length L may be at least about 8 mm, at least about 10 mm, or about 12 mm or longer. For example, the length L may be within a range of from about 8 mm or about 10 mm to about 24 mm, from about 12 mm to about 24 mm, or from about 12 mm to about 20 mm.

The gap between the resistive sections 220 of the wire 210 may be about 1 mm, or greater than or less than about 1 mm. As indicated above, the outer diameter of the coated optical fiber 100 may be about 250 um, so that in one example the gap between the resistive sections 220 may be about 4 times greater than the outer diameter of the optical fiber 100. As a more general example, the gap between the resistive sections 220 may have a predetermined width that is within a range of from about 3 times the outer diameter of the coated optical fiber 100 to about 5 times the outer diameter of the coated optical fiber.

The wire 210 could be otherwise configured such that it is arranged in more than two resistive sections 220. However many resistive sections 220 are used, they may extend along and be substantially parallel to the heating region 205 and fiber section 150 in a radially symmetrical configuration that seeks to ensure uniform heating throughout the fiber section 150 to be stripped. These positional relationships between the resistive sections 220, heating region 205 and fiber section 150 can be maintained substantially without change even when the wire 210 expands during heating. For example, in the embodiment shown in FIG. 1, one or more ends of the wire 210 or resistive sections 220 can be free-standing so that the wire can expand and contract along the axial directions of the resistive sections 220, heating region 205 and fiber section 150. In another embodiment, one or more ends of the wire 210 or resistive sections 220 can be held with spring(s) to allow the expansion of the wire 210 during heating. As one example, the wire 210 may be a 0.2 mm diameter Nichrome wire of the type used in electrically heated cigarette lighters that plug into direct current electrical sockets of automobiles.

In one embodiment, the stripping apparatus 10 is automatically operative, such as under the control of the controller 500, so that the heater 200 is deactivated or turned off shortly before, or not later than immediately after (e.g., in response to), the explosion that "strips" the coatings 120, 130 away from the fiber section 150. Quickly turning off the heater 200 in this manner seeks, for example, to avoid any oxidation and burning of the unstripped sections of the coatings 120, 130.

The thermal mass of the heater 200 and fiber 100 may be low enough such that natural convection substantially brings down their temperatures to the ambient temperature generally rapidly, such as within about 5 seconds after the heater 200 is turned off Because the heater 200 is turned off not later than immediately after vaporization and explosion of the coatings 120, 130 from the fiber section 150, and because the heater 200 cools quickly due to low thermal mass, any thermal decomposition and oxidization of the remaining edges of the coatings 120, 130 can be substantially eliminated without the need for a non-oxidizing gas environment. Restricting any oxidization can also preserve the tensile strength of the fiber 100, such as by maintaining at least about 98% or over 98% of the tensile strength of the fiber 100. Alternatively, the stripping apparatus 10 may optionally comprise a non-oxidizing gas environment.

As mentioned above, the heater 200 can include or be a resistive heating element (e.g. a strip of conductive metal and/or wire 210 made of conductive metal). The controller 500 and associated features can be configured for automatically controlling the flow of electrical current through the wire 210, for controlling the heat generated by the wire 210. For example, the electrical current supplied to the wire 210 may be controlled by the controller 500 according to a predetermined electrical current profile. As a more specific example, the electrical current can be supplied to the wire 210 for a period of time, with a greater electrical current being supplied during the first part of that time for increasing the rate of temperature rise. Then, the electrical current may be reduced once the temperature is close to the predetermined operating temperature. However, it will be appreciated that the controller 500 may provide other suitable electrical current profiles and/or be used with other types of heaters to achieve a desired heating profile(s).

As alluded to above, the stripping apparatus 10 may include at least one sensor 400, such as a sound and/or light sensor configured for sensing the explosion or bursting of the coatings 120, 130 of the fiber section 150. The explosion of the coatings 120, 130 may comprise a unique "pop" sound and flash of light, either of which can be used as a termination condition that is sensed by the sensor 400 and causes the sensor to send an electrical signal to the controller 500, prompting it to deactivate or turn off the heater 200. The sensor 400 and controller 500 may be in communication and cooperative such the heater 200 is shut off immediately by the controller 500 upon the detection of the explosive "pop" sound or the detection of emitted flash of light that are indicative of the explosion or bursting of the coatings 120, 130 of the fiber section 150. For example, the sensor 400 and controller 500 may be in communication and cooperative such the heater 200 is shut off in less than 10 milliseconds, or even less than 1 millisecond, after the explosion that "strips" the coatings 120, 130 away from the fiber section 150.

As another example, the heater 200 can be also controlled by using an appropriate sensor 400 to optically monitor a precursor of the subject explosion, such as the onset of deformation of the coatings 120, 130 of the fiber section 150, a change in the diameter of the fiber section 150, or the like, so that the heater can be turned off prior to the explosion, which seeks to maintain the tensile strength of the fiber 100. For example, the controller 500 may deactivate or switch off the heater 200 in response to the sensor 400 detecting deformation of the fiber section 150, a change in the diameter of the fiber section 150, and/or any other suitable triggers, wherein these triggers may be precursors to the subject explosion.

In embodiments using an acoustic or sound sensor 400, immunity to ambient sound interference may be improved by using filters which take into account an audio frequency signature of the explosion or bursting of the coatings 120, 130. The controller 500 may be configured so that such audio signatures can be programmed thereinto. In addition, the controller 500 and at least one sensor 400 may be cooperatively configured so that acoustic, optical, and/or other types of feedback control allow stripping methods of this disclosure to accommodate different types of one or more of the coatings 120, 130.

In addition or alternatively, the heater 200 can be controlled without using the sensor 400, or the sensor may be used to identify a secondary termination condition, wherein the controller 500 may be configured to turn off the heater in response to a primary termination condition that is intended to occur and normally occurs prior to the secondary termination condition. For example, the controller 500 may be configured so that the heater 200 is turned off or deactivated at a predetermined time, wherein the predetermined time may be a specific time within a range of from about 200 milliseconds to about 2 seconds after the heater is turned on or activated, the predetermined time may be a specific time within a range of from about 500 milliseconds to about 1.5 seconds after the heater is activated, the predetermined time may be about 0.9 seconds after heater is activated, the predetermined time may be about 0.95 seconds after heater is activated, the predetermined time may be about 1 second after heater is activated, and/or the predetermined time may be within a range of from about 1 millisecond to about 500 milliseconds before the explosion that "strips" the coatings 120, 130 away from the fiber section 150. The selection of the predetermined time at which the controller 500 turns off the heater 200 may depend upon factors associated with the configuration of the multi-layer coating 140 and/or the configuration of the stripping apparatus 10; therefore, the predetermined time may be determined based upon empirical evidence.

Figure 3A:
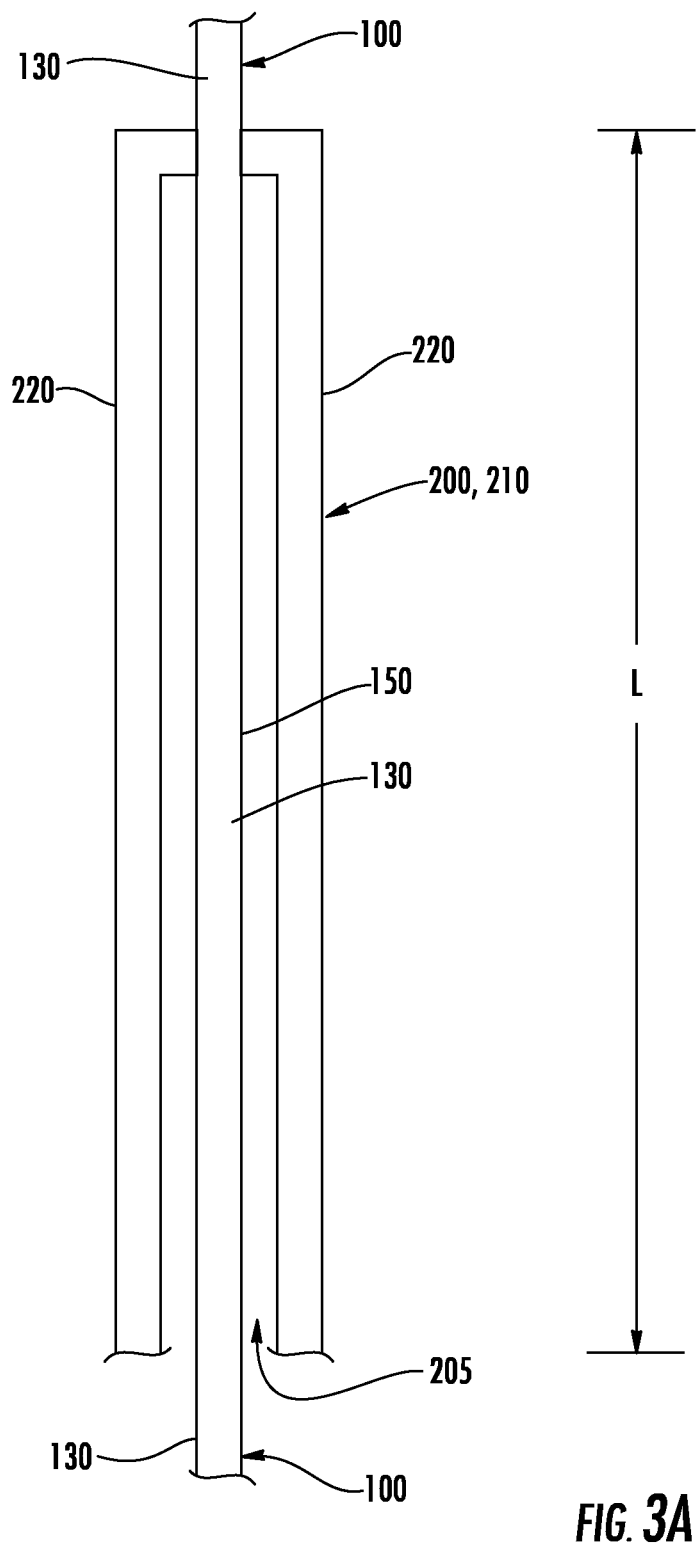
FIG. 3A is a top plan view of a portion of the assembly of FIG. 1, showing a portion of the optical fiber and a heating element of the stripping apparatus in a first state in which the heating element is unheated and the optical fiber is unstripped.
Figure 3B:
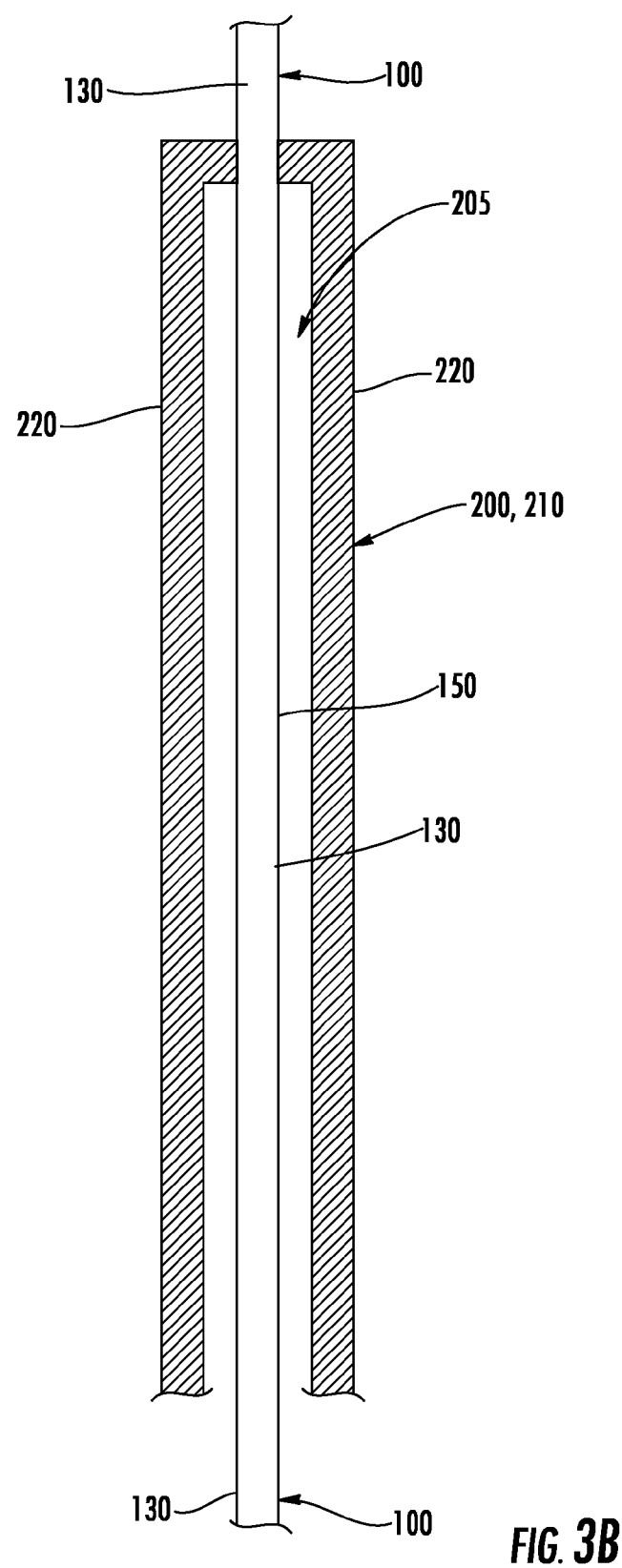
FIG. 3B is like FIG. 3A, except for being schematically illustrative of a second state in which the heating element is heated, wherein the heating element being red hot is schematically represented by diagonal hatching.

After the fiber 100 is mounted to the securing mechanisms 310, 320 as generally shown in FIG. 1 and the stripping process is initiated, such as by a user operating a feature, such as a button, key, or the like, that may be provided by the controller 500, or the user otherwise initiating the providing of the electrical current to the heater 200, the stripping apparatus 10 may be able to strip the coatings 120, 130 from the fiber section 150 in less than about 2 seconds. As an example of a method operation of the stripping apparatus 10, a sequence of operational states of the stripping apparatus 10 is shown in FIGS. 3A-3D. FIG. 3A shows the heater 200 and an associated section of the secured fiber 100 before the heater 200 is switched on. FIG. 3B shows the heater 200 partially heated at about 0.5 seconds after electrical power is switched on for the heater 200, wherein the wire 210 being red hot is schematically represented by diagonal hatching in the wire 210.

Figure 3C:
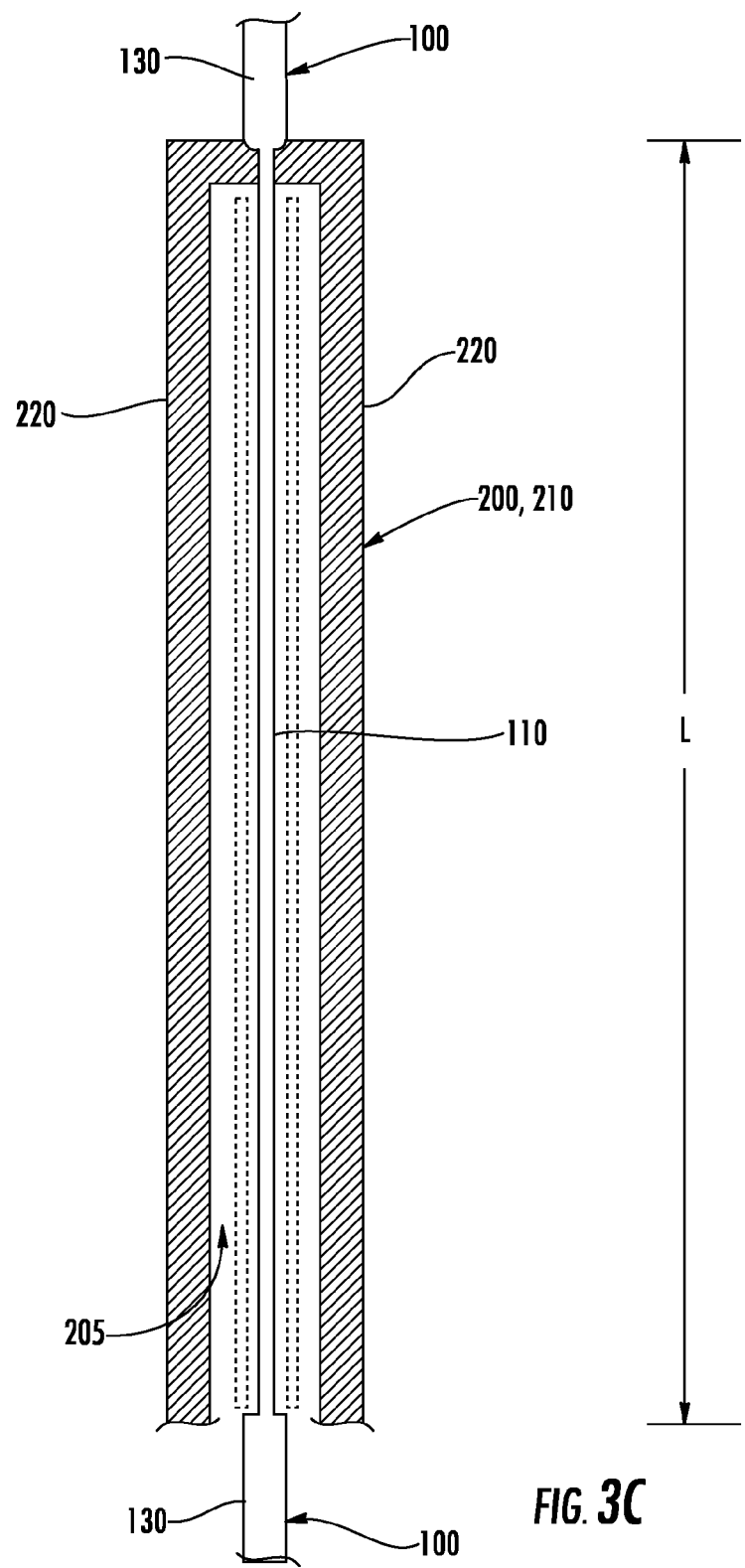
FIG. 3C is like FIG. 3B, except for being schematically illustrative of a third state in which a length of at least one coating of the optical fiber is stripping or separating (e.g., exploding away) from the cladding of the optical fiber, wherein the heating element being yellow-white hot is schematically represented by diagonal hatching.

It may take about 1 second or less for the wire 210 to reach its maximum temperature, and the fiber coatings 120, 130 of the fiber section 150 may remain intact for about the first 0.8 seconds after the heater 200 is activated. FIG. 3C shows the heater 200 substantially fully heated at about 0.95 seconds or about 1 second after power is switched on for the heater 200, wherein the wire 210 being yellow-white hot is schematically represented by horizontal hatching in the wire 210. In FIG. 3C, substantially the entirety of the coatings 120, 130 of the fiber section 150 are shown being exploded away from the cladding 110 of the fiber section 150, wherein the explosion is schematically represented by stippling. This explosion may occur at about 1 second after power is switched on for the heater 200, and the explosion may be accompanied by an audible "pop" sound and/or a flash of light that may be detected by the sensor(s) 400.

Figure 3D:
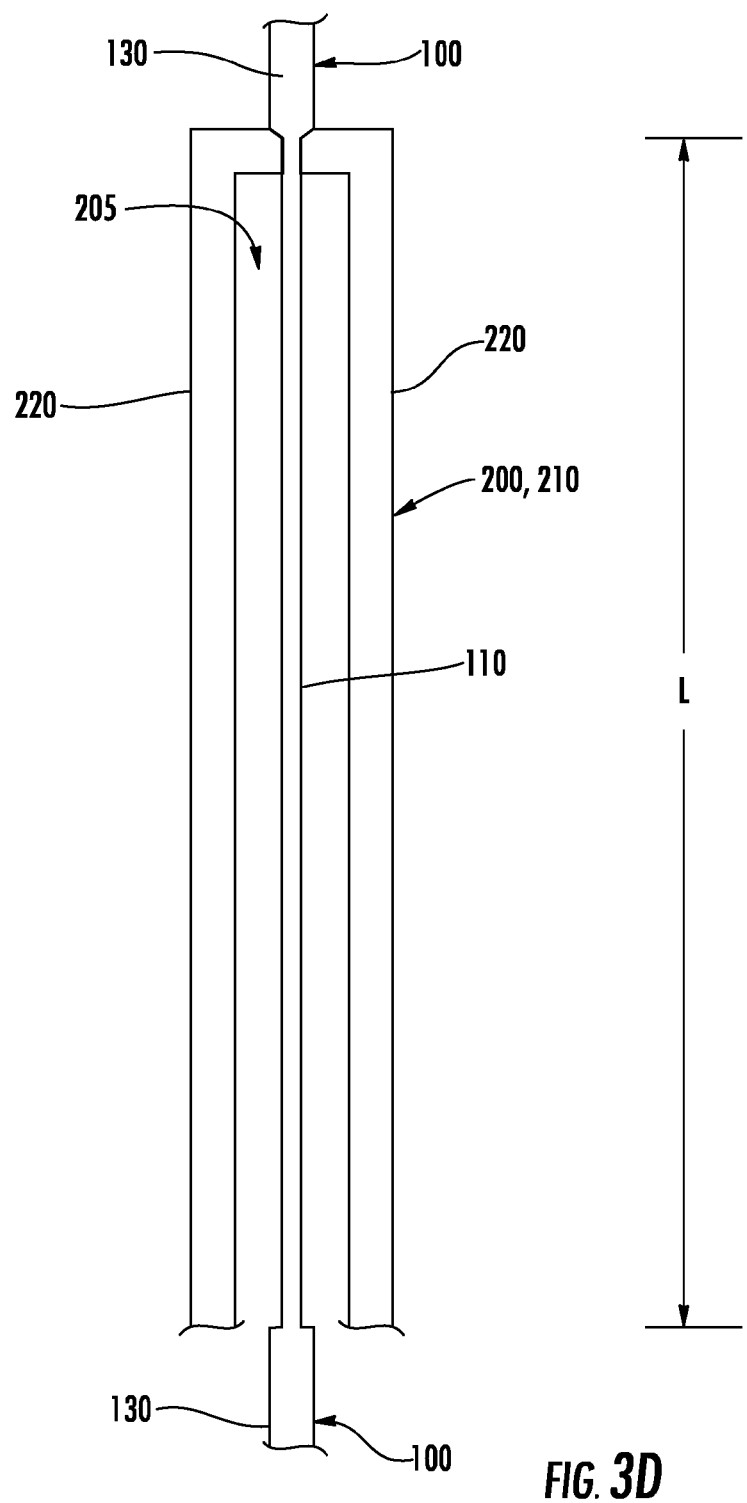
FIG. 3D is like FIG. 3A, except for being illustrative of a fourth state in which a mid span of the optical fiber has been stripped of coatings.

The electrical power to the heater 200 may be turned off shortly before or immediately after the explosion, such as in response to the sensor 400 sensing an audible "pop" sound and/or a flash of light that may be associated with the explosion. Thereafter, the heater 200 may be quickly cooled by the ambient environment, such as in about 5 seconds after the heater 200 has been turned off, as shown in FIG. 3D. As shown in FIG. 3D, the length L of the portion of the cladding 110 from which the coatings 120, 130 have been stripped can substantially match both the length of the heating region 205 and the length of the heated resistive sections 220. The majority of the sections of the coatings 120, 130 that are stripped may bursts away from the cladding 110 substantially without generating smoke, and substantially without leaving carbon residue on the glass cladding 110.

As schematically shown in FIG. 1, the controller 500 may include a rechargeable battery 510 that powers the controller 500 and provides electrical current to the heater 200. In one example, the battery 510 can be a 12 volt power supply with duty cycle and duration controls. The controller 500 may further include a switch 520 that opens and closes a circuit 530 which provides the electrical current to the heater 200. In embodiments including an electrically powered heater 200, such as the wire 210, the controller 500 can turn on or switch on the heater 200 by closing the switch 520 to initiate a flow of electrical current to the heater 200. Conversely, the controller 500 can turn off the heater 200 by opening the switch 520 to stop the flow of electrical current to the heater 200 when the termination condition is met, wherein the termination condition can be the explosion of the coatings 120, 130, any suitable precursor thereto, and/or a predetermined time, such as the predetermined times discussed above.

The sensor 400 and heater 200 may both be portable pluggable devices capable of being plugged into and in electrical communication with (e.g., powered by) the controller 500. The controller 500 may be a portable handheld device that may be in some ways similar to or associated with a smartphone, or the like, and the securing mechanisms 310, 320 may also be portable, such that the entire stripping apparatus 10 may be portable and suitable for field use. Alternatively or in addition, the stripping apparatus 10 may also be configured for use in manufacturing settings.

The controller 500 may include processing circuitry, such as processing circuitry of a computer, that is configurable to perform actions in accordance with one or more exemplary embodiments disclosed herein. In some exemplary embodiments, the processing circuitry may include a processor 550 and memory. The processing circuitry may be in communication with or otherwise control, for example, a user interface 560, and one or more other components, features and/or modules (e.g., software modules). The user interface 560 can include a feature, such as a button, key, or the like, for being actuated by a user to initiate the stripping process. The processor may be embodied in a variety of forms. For example, the processor may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. The processor may comprise a plurality of processors. The plurality of processors may be in operative communication with each other and may be collectively configured to perform one or more functionalities of this disclosure. In some exemplary embodiments, the processor may be configured to execute instructions that may be stored in the memory or that may be otherwise accessible to the processor. As such, whether configured by hardware or by a combination of hardware and software, the processor is capable of performing operations according to various embodiments of this disclosure.

In some exemplary embodiments, the memory may include one or more memory devices. The memory may include fixed and/or removable memory devices. In some embodiments, the memory may provide a non-transitory computer-readable storage medium that may store computer program instructions that may be executed by the processor. In this regard, the memory may be configured to store information, data, applications, instructions and/or the like for enabling the stripping apparatus 10 to carry out various functions in accordance with the various embodiments of this disclosure. In some embodiments, the memory may be in communication with one or more of the processor 550, user interface 560, and one or more other modules via bus(es) for passing information.

The user interface 560 may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

In one embodiment, the controller 500 can include a number of different modules for selection by a user. Each module may comprise an electrical current profile defining the electrical current pulse(s) to be supplied to the heater 200 and the duration of the pulse(s) (e.g., there may be a single stage of electrical current, or there may be multiple stages of electrical currents with the same or different durations). Accordingly, the operating of the heater 200 for a predetermined time may comprise a single stage of electrical current being supplied to the heater for the predetermined time, or the operating of the heater for a predetermined time may comprise multiple stages of electrical currents being supplied to the heater during the predetermined time. For example, the controller 500 can be an open-loop controller that does not rely on the feedback from the sensor 400 regarding the explosion of the coatings 120, 130. The various electrical current profiles may have some (e.g., slight) dependence on the materials of the multilayer coating 140, the diameters of the coatings 120, 130, the inclusion of any colored ink layers for identification, and/or any other suitable factors. These factors and/or one or more other conditions can be pre-stored in modules of the controller 500 that are made available for selection by way of the user interface 560.

Variations are within the scope of this disclosure. For example, the heater 200 may comprise suitable heating elements other than or in addition to a metal wire, and the heater 200 may comprise more or less than two heated resistive sections 220.

Persons skilled in fiber stripping or optical connectivity will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is no way intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. An apparatus for removing at least one coating from a lengthwise section of an optical fiber, wherein the at least one coating has a thermal decomposition temperature, and the apparatus comprises:
   a heater configured for heating a heating region to a temperature above the thermal decomposition temperature of the at least one coating;
   a securing mechanism configured for securing the optical fiber so that the lengthwise section of the optical fiber is positioned in the heating region;
   a controller operatively associated with the heater; and
   a sensor for detecting explosive removal of the at least one coating from the lengthwise section of the optical fiber, wherein the controller is configured and operatively associated with the sensor for deactivating the heater in response to the sensor detecting explosive removal of the at least one coating from the lengthwise section of the optical fiber, so that the deactivating of the heater occurs not later than immediately after the explosive removal of the at least one coating from the lengthwise section of the optical fiber in the heating region.

2. The apparatus of claim 1, wherein:
   the heater is an electrical heater comprising a first electrical resister configured to become hot in response to electrical current passing therethrough, and a second electrical resister configured to become hot in response to electrical current passing therethrough; and
   the heating region is positioned between the first electrical resister and the second electrical resister.

3. The apparatus of claim 2, wherein the first and second electrical resisters comprise sections of a bent piece of wire.

4. The apparatus of claim 2, wherein the first and second electrical resisters are respectively arranged in positions that are substantially radially symmetrical about an axis of the heating region.

5. The apparatus of claim 4, wherein the first and second electrical resisters comprise sections of a bent piece of wire, and the sections of the wire are spaced apart from one another by a distance that is within a range of from about 3 times an outer diameter of the optical fiber to about 5 times the outer diameter of the optical fiber.

6. The apparatus of claim 1, wherein the heating region has a length of at least about 10 mm.

7. The apparatus of claim 1, wherein the heater is configured for being heated to a temperature above 800° C. in less than 1 second.

8. The apparatus of claim 1, wherein the heater is configured for heating the at least one coating of the lengthwise section of the optical fiber positioned in the heating region to at least about 400° C. in less than 1 second.

9. The apparatus of claim 1, wherein the controller is configured to deactivate the heater within about 1 millisecond after the explosive removal of the at least one coating from the lengthwise section of the optical fiber in the heating region.

10. A method for removing at least one coating from a lengthwise section of an optical fiber, the method comprising:
    securing the optical fiber so that the lengthwise section of the optical fiber is positioned in a heating region;
    heating the at least one coating of the lengthwise section of the optical fiber to a temperature above a thermal decomposition temperature of the at least one coating while the lengthwise section of the optical fiber is in the heating region, wherein:
    the heating is comprised of operating a heater;
    the at least one coating comprises an inner coating and an outer coating,
    the inner coating has a thermal decomposition temperature,
    the outer coating has a thermal decomposition temperature above the thermal decomposition temperature of the inner coating, and
    the heating is comprised of heating the inner coating to a temperature that is above the thermal decomposition temperature of the inner coating and below the thermal decomposition temperature of the outer coating, so that the removing of the at least one coating from the lengthwise section of the optical fiber is comprised of exploding the at least one coating away from the lengthwise section of the optical fiber; and
    deactivating the heater not later than immediately after removal of the at least one coating from the lengthwise section of the optical fiber in the heating region.

11. The method of claim 10, wherein the deactivating of the heater is comprised of deactivating the heater at a predetermined time that is within a range of from about 1 millisecond to about 500 milliseconds before removal of the at least one coating from the lengthwise section of the optical fiber in the heating region.

12. The method of claim 10, wherein:
    the operating of the heater is comprised of activating the heater; and
    the deactivating of the heater is comprised of deactivating the heater at a predetermined time that is before removal of the at least one coating from the lengthwise section of the optical fiber in the heating region.

13. The method of claim 12, wherein the predetermined time is within a range of from about 1 millisecond to about 500 milliseconds before removal of the at least one coating from the lengthwise section of the optical fiber in the heating region.

14. The method of claim 10, wherein:
    the operating of the heater is comprised of activating the heater;
    the deactivating of the heater is comprised of deactivating the heater at a predetermined time after the activating of the heater; and
    the predetermined time is within a range of from about 200 milliseconds to about 2 seconds.

15. The method of claim 10, wherein the lengthwise section of the optical fiber is positioned in an ambient atmosphere during the removing at least one coating from the lengthwise section of the optical fiber.

16. The method of claim 10, wherein the heating comprises heating the at least one coating of the lengthwise section of the optical fiber positioned in the heating region to at least about 400° C. in less than 1 second.

17. The method of claim 10, wherein the exploding of the at least one coating away from the lengthwise section of the optical fiber is comprised of exploding an elongate substantially cylindrical section of the at least one coating away from a remainder of the optical fiber.

18. The method of claim 17, wherein the substantially cylindrical section of the at least one coating that is exploded away from the remainder of the optical fiber has a length of at least about 8 mm.

* * * * *